United States Patent
Bortoli et al.

(10) Patent No.: US 11,226,026 B2
(45) Date of Patent: Jan. 18, 2022

(54) MULTISPEED TRANSMISSION

(71) Applicant: Hamilton Sundstrand Corporation, Charlotte, NC (US)

(72) Inventors: Stephen Michael Bortoli, Roscoe, IL (US); Aaron M. Finke, Janesville, WI (US); Mark J. Franklin, Janesville, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 202 days.

(21) Appl. No.: 16/387,961

(22) Filed: Apr. 18, 2019

(65) Prior Publication Data

US 2020/0332862 A1 Oct. 22, 2020

(51) Int. Cl.
*F16H 3/093* (2006.01)
*F02C 7/32* (2006.01)

(52) U.S. Cl.
CPC .............. *F16H 3/093* (2013.01); *F02C 7/32* (2013.01); *F05D 2260/4031* (2013.01); *F16H 2200/0039* (2013.01); *F16H 2200/0043* (2013.01)

(58) Field of Classification Search
CPC ............ F16H 3/093; F16H 2003/0931; F16H 2200/0039; F16H 2200/0043; F02C 7/32; F05D 2260/4031
USPC ........................................................ 74/331
See application file for complete search history.

(56) References Cited

U.S. PATENT DOCUMENTS

| 6,810,772 | B2 | 11/2004 | Hori et al. |
| 7,597,020 | B2* | 10/2009 | Baldwin ............. B60W 10/113 |
| | | | 74/330 |
| 7,942,079 | B2 | 5/2011 | Russ |
| 8,840,505 | B2 | 9/2014 | Frait |
| 9,003,906 | B2* | 4/2015 | Phillips .................. F16H 3/006 |
| | | | 74/330 |
| 9,347,373 | B2 | 5/2016 | Menheere et al. |

(Continued)

FOREIGN PATENT DOCUMENTS

| CN | 2924171 Y | 7/2007 |
| DE | 19840084 A1 | 3/2000 |

(Continued)

OTHER PUBLICATIONS

Extended European Search Report dated Mar. 6, 2020, issued during the prosecution of European Patent Applicaton No. EP 19209843.2.

*Primary Examiner* — William C Joyce
(74) *Attorney, Agent, or Firm* — Locke Lord LLP; Daniel J. Fiorello; Gabrielle L. Gelozin (57) ABSTRACT

A multispeed turbomachine transmission can include an input shaft and a plurality of input shaft gears disposed on the input shaft. The transmission can include one or more clutch shafts, one or more clutch shaft input gears disposed on the one or more clutch shafts, each meshed with at least one of the plurality of input shaft gears, at least one clutch shaft output gear mounted to each clutch shaft, a clutch connected to each clutch shaft and configured to selectively connect the one or more clutch shaft input gears to the at least one clutch shaft output gear. The transmission can include an output shaft and at least one output shaft gear connected to the output shaft and meshed with the at least one clutch shaft output gear.

14 Claims, 11 Drawing Sheets

(56) References Cited

U.S. PATENT DOCUMENTS

| | | |
|---|---|---|
| 9,453,540 B2 | 9/2016 | Agner et al. |
| 10,167,948 B2 | 1/2019 | Ghike et al. |
| 10,533,637 B2 * | 1/2020 | Kang .................. F16H 3/006 |
| 2016/0017958 A1 | 1/2016 | Wu et al. |
| 2018/0020231 A1 | 1/2018 | Winetraub et al. |
| 2018/0045119 A1 | 2/2018 | Sheridan et al. |
| 2018/0202368 A1 | 7/2018 | Suciu et al. |
| 2018/0209513 A1 | 7/2018 | Lemmers, Jr. |

FOREIGN PATENT DOCUMENTS

| | | |
|---|---|---|
| EP | 1819943 A1 | 8/2007 |
| WO | 2006056804 | 6/2006 |

\* cited by examiner

MULTISPEED TRANSMISSION

BACKGROUND

1. Field

This disclosure relates to transmissions, more specifically to multispeed transmission systems, e.g., for low speed spool turbomachine engines.

2. Description of Related Art

Moving turbomachine engine accessories to the low speed spool requires a speed converting transmission to take a wide speed range and convert it into a narrow speed range. One method of doing this is the use of a shifting transmission consisting of clutches that selectively engage different gear ratios.

Such conventional methods and systems have generally been considered satisfactory for their intended purpose. However, there is still a need in the art for improved transmission systems. The present disclosure provides a solution for this need.

SUMMARY

A multispeed turbomachine transmission can include an input shaft and a plurality of input shaft gears disposed on the input shaft. The transmission can include one or more clutch shafts, one or more clutch shaft input gears disposed on the one or more clutch shafts, each meshed with at least one of the plurality of input shaft gears, at least one clutch shaft output gear mounted to each clutch shaft, a clutch connected to each clutch shaft and configured to selectively connect the one or more clutch shaft input gears to the at least one clutch shaft output gear. The transmission can include an output shaft and at least one output shaft gear connected to the output shaft and meshed with the at least one clutch shaft output gear.

One or more of the plurality of input shaft gears can be rotatably mounted to the input shaft to be able to rotate relative to the input shaft. One or more synchronizers can be disposed on the input shaft and configured to selectively connect one or more of the plurality of input shaft gears to the input shaft such that the selected input shaft gear rotates with the input shaft. The one or more synchronizers can include at least one synchromesh, for example. Any other suitable synchronizer is contemplated herein.

The one or more clutch shafts can include a first clutch shaft having a first clutch disposed thereon. The one or more clutch shafts can also include a second clutch shaft having a second clutch disposed thereon. Any suitable number clutch shafts and clutches is contemplated herein.

In certain embodiments, the transmission can include at least three speeds. A first speed can be through the first clutch shaft, a second speed can be through the second clutch shaft, and a third speed can be through the first clutch shaft.

The one or more input shaft gears can include a first input shaft gear, a second input shaft gear, and a third input shaft gear each configured to rotate relative to the input shaft when disengaged by the one or more synchronizers and to rotate with the shaft when engaged by the one or more synchronizers. The one or more clutch shaft input gears can include a first clutch shaft input gear on the first clutch shaft meshed with the first input shaft gear and configured to rotate relative to the first clutch shaft when the first clutch is disengaged and to rotate with the first clutch shaft when the first clutch is engaged. The one or more clutch shaft input gears can include a second clutch shaft input gear on the second clutch shaft meshed with the second input shaft gear and configured to rotate relative to the second clutch shaft when the second clutch is disengaged and to rotate with the second clutch shaft when the second clutch is engaged. The one or more clutch shaft input gears can include a third clutch shaft input gear on the first clutch shaft meshed with the third input shaft gear and configured to rotate relative to the first clutch shaft when the first clutch is disengaged and to rotate with the first clutch shaft when the first clutch is engaged.

The one or more synchronizers can include a first synchronizer and a second synchronizer, wherein the first synchronizer can be configured to engage the first input shaft gear to the input shaft when actuated in a first direction, and to engage the third input shaft gear when actuated in a second direction. The second synchronizer can be configured to engage the second input shaft gear to the input shaft when actuated.

The at least one clutch shaft output gear can include a first clutch shaft output gear fixed to the first clutch shaft to rotate with the first clutch shaft and a second clutch shaft output gear fixed to the second clutch shaft to rotate with the second clutch shaft. The at least one output shaft gear can include a single output shaft gear. The first clutch shaft output gear and the second clutch shaft output gear can both be meshed to the single output shaft gear.

The transmission can include a fourth speed through at least one of the first clutch shaft or the second clutch shaft. For example, the one or more input shaft gears include a fourth input shaft gear fixed to the input shaft to rotate with the input shaft. The one or more clutch shaft input gears can include a fourth clutch shaft gear meshed with the fourth input shaft gear and mounted to the first clutch shaft or the second clutch shaft via an overrunning clutch.

The first speed can be achieved by moving the first synchronizer in a first direction to engage the first input shaft gear to the input shaft, which turns the first input shaft gear with the input shaft such that the first input shaft gear drives the first clutch shaft input gear, and by engaging the first clutch to engage the first clutch shaft input gear to the first clutch shaft to turn the first clutch shaft with the first clutch shaft input gear, which turns the first clutch shaft output gear, which drives the output shaft gear to turn the output shaft in accordance with a first speed ratio relative to the input shaft. The second speed can be achieved by actuating the second synchronizer to engage the second input shaft gear to the input shaft, which turns the second input shaft gear with the input shaft such that the second input shaft gear drives the second clutch shaft input gear, and by engaging the second clutch to engage the second clutch shaft input gear to the second clutch shaft to turn the second clutch shaft with the second clutch shaft input gear, which turns the second clutch shaft output gear, which drives the output shaft gear to turn the output shaft in accordance with a second speed ratio relative to the input shaft.

The third speed can be achieved by moving the first synchronizer in a second direction to engage the third input shaft gear to the input shaft, which turns the third input shaft gear with the input shaft such that the third input shaft gear drives the third clutch shaft input gear, and by engaging the first clutch to engage the third clutch shaft input gear to the first clutch shaft to turn the first clutch shaft with the third clutch shaft input gear, which turns the first clutch shaft output gear, which drives the output shaft gear to turn the output shaft in accordance with a third speed ratio relative to the input shaft. In certain embodiments, the fourth speed can be achieved by disengaging all synchronizers and all clutches such that fourth input shaft gear drives the fourth clutch shaft input gear and the overrunning clutch engages the fourth clutch shaft input gear to the second clutch shaft, which turns the second clutch shaft output gear, which drives the output shaft gear to turn the output shaft in accordance with a fourth speed ratio relative to the input shaft. Any other suitable synchronizer and/or clutch arrangements and/or actuation schemes are contemplated herein.

In certain embodiments, for a given input speed, the first gear output speed can be faster than the second gear output speed, the second gear output speed can be faster than the third gear output speed, and the third gear output speed can be faster than the fourth gear output speed. Any other suitable speeds and any suitable gear ratios are contemplated herein.

In accordance with at least one aspect of this disclosure, a method for controlling a transmission can include actuating a first synchronizer in a first direction on an input shaft to engage a first input shaft gear to the input shaft to drive a first clutch shaft gear on a first clutch shaft, and engaging a first clutch to engage the first clutch shaft gear to the first clutch shaft to achieve a first speed, actuating a second synchronizer on the input shaft to engage a second input shaft gear to the input shaft to drive a second clutch shaft gear on a second clutch shaft, disengaging the first clutch while engaging a second clutch to engage the second clutch shaft gear to the second clutch shaft to achieve a second speed, and actuating the first synchronizer in a second direction on the input shaft to engage a third input shaft gear to the input shaft to drive the third clutch shaft gear on the first clutch shaft, disengaging the second clutch while engaging the first clutch to engage the third clutch shaft gear to the first clutch shaft to achieve a third speed.

The method can include disengaging all synchronizers and clutches to cause an overrunning clutch to engage and to achieve a fourth speed. The method can include sensing speed at one or both of the input shaft and the output shaft using one or more speed sensors to determine when to actuate into a desired speed. The method can include providing hysteresis in shifting between speeds (e.g., having a lower upshift speed than a downshift speed between the same two gears). Any other suitable control method to achieve any suitable speed is contemplated herein.

In accordance with at least one aspect of this disclosure, an aircraft turbomachine low speed spool transmission can include four speeds. Any other suitable number of speeds (e.g., 3, 5, 10, etc.) is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
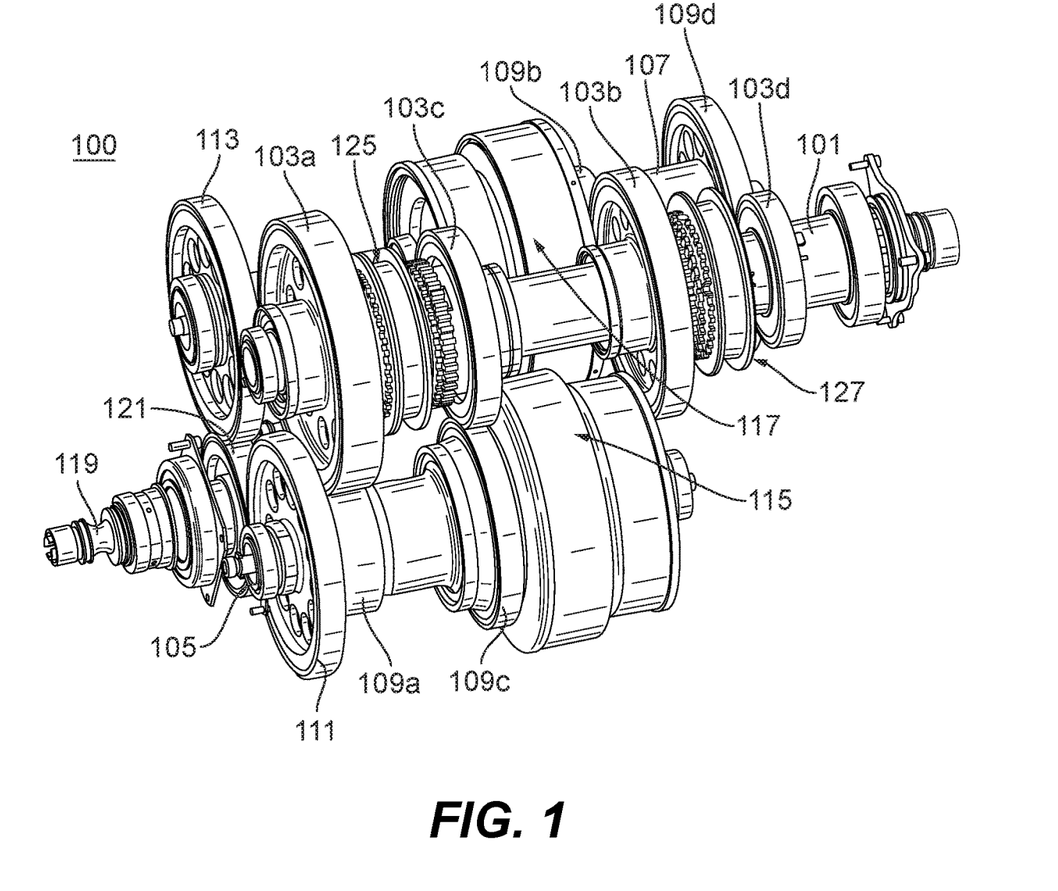
FIG. 1 is a perspective view of an embodiments of a transmission in accordance with this disclosure.

Reference will now be made to the drawings wherein like reference numerals identify similar structural features or aspects of the subject disclosure. For purposes of explanation and illustration, and not limitation, an illustrative view of an embodiment of a transmission in accordance with the disclosure is shown in FIG. 1 and is designated generally by reference character 100. Other embodiments and/or aspects of this disclosure are shown in FIGS. 2-12.

Referring generally to FIGS. 1-9, a multispeed turbomachine transmission 100 can include an input shaft 101 and a plurality of input shaft gears 103a, 103b, 103c, 103d disposed on the input shaft 101. The transmission 100 can include one or more clutch shafts 105, 107. The transmission 100 can include one or more clutch shaft input gears 109a, 109b, 109c, 109d disposed on the one or more clutch shafts 105, 107, each meshed with at least one of the plurality of input shaft gears 103a, 103b, 103c, 103d, e.g., meshed respectively as shown. The transmission 100 can include at least one clutch shaft output gear 111, 113 mounted to each clutch shaft 105, 107, e.g., respectively as shown.

The transmission 100 can include a clutch 115, 117 connected to each clutch shaft 105, 107, e.g., respectively as shown. Any suitable number of clutches is contemplated herein. Any suitable type of clutch is contemplated herein. For example, one or more clutches 115, 117 can include a hydraulically actuated clutch, a mechanically actuated clutch, a wet clutch, a piston/friction disc clutch, and/or any combination thereof or having any other suitable characteristics. Each clutch 115, 117 can be configured to selectively connect the one or more clutch shaft input gears 109a, 109b, 109c, 109d to the at least one clutch shaft output gear 111, 113 (e.g., by engaging the one or more clutch shaft input gears 109a, 109b, 109c, 109d to a respective clutch shaft 105, 107.

The transmission 100 can include an output shaft 119 and at least one output shaft gear 121 connected to the output shaft 119 and meshed with the at least one clutch shaft output gear 111, 113. Any other output shaft arrangement is contemplated herein.

Figure 2:
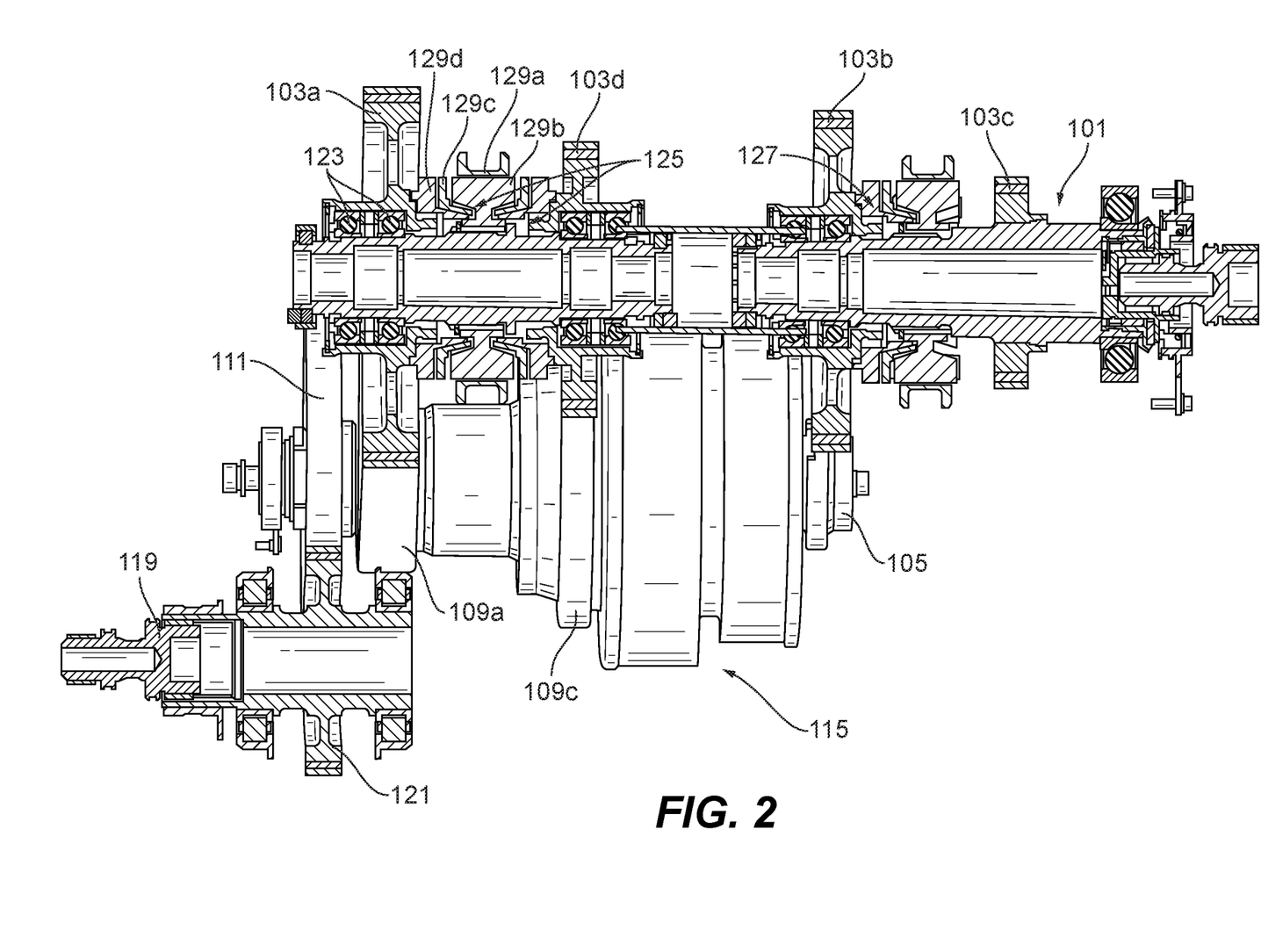
FIG. 2 is a cross-sectional view of the embodiment of FIG. 1, sectioned through the input shaft and the output shaft.
Figure 3:
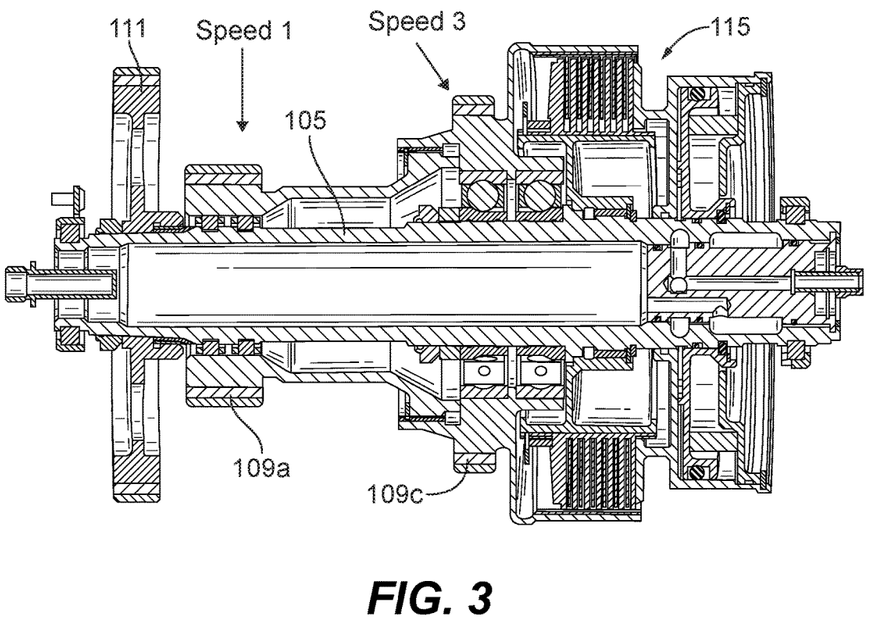
FIG. 3 is a cross-sectional view of an embodiment of a first clutch shaft of the embodiment of FIG. 1.
Figure 4:
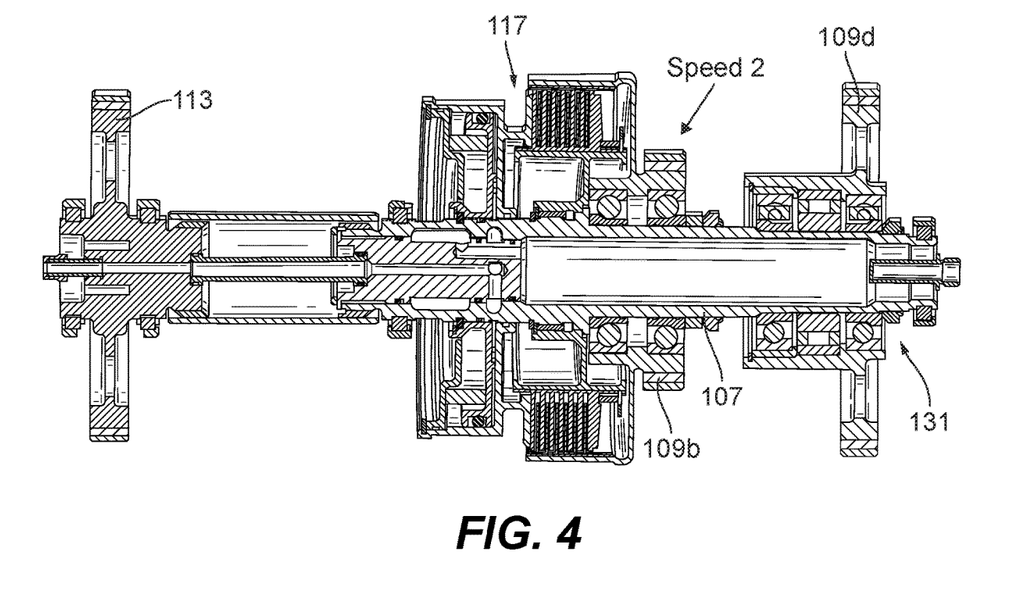
FIG. 4 is a cross-sectional view of an embodiment of a second clutch shaft of the embodiment of FIG. 1.

As shown in FIG. 2, for example, one or more of the plurality of input shaft gears 103a, 103b, 103c can be rotatably mounted (e.g., via one or more bearings 123) to the input shaft 101 to be able to rotate relative to the input shaft 101. One or more synchronizers 125, 127 can be disposed on the input shaft 101 and can be configured to selectively connect one or more of the plurality of input shaft gears 103a, 103b, 103c to the input shaft 101 such that the input shaft gears 103a, 103b, 103c rotate with the input shaft 101.

In certain embodiments, the one or more synchronizers 125, 127 can include at least one synchromesh, e.g., as shown, for example. For example, as shown, the synchronizers 125, 127 can include a sliding collar 129a (e.g., splined to a member 129b that is attached to and rotates with the input shaft 101), one or more synchro rings 129c configured to be engaged by sliding collar 129a, and one or more friction cones 129d, each attached to a respective input shaft gear 103a, 103b, 103c and configured to be frictionally engaged by a synchro ring 129c to cause the input shaft gear 103a, 103b, 103c to be synchronized in speed with the input shaft 101. When synchronized, the friction cone 129d can then be engaged by the sliding collar 129a to mechanically connect the input shaft gear 103a, 103b, 103c to the input shaft 101. Any other suitable synchronizer assembly and/or additionally actuation components are contemplated herein.

The one or more clutch shafts 105, 107 can include a first clutch shaft 105 having a first clutch 115 disposed thereon. The one or more clutch shafts 105, 107 can also include a second clutch shaft 107 having a second clutch disposed thereon 117. Any suitable number clutch shafts and clutches is contemplated herein. For example, all speeds can be located on a single shaft.

Referring additionally to FIGS. 3-6, in certain embodiments, the transmission 100 can include at least three speeds. As described herein, the term "speed" means a ratio of the input shaft to the output shaft as appreciated by those having ordinary skill in the art. A first speed can be through the first clutch shaft 105, a second speed can be through the second clutch shaft 107, and a third speed can be through the first clutch shaft 105. Any other suitable speed arrangement is contemplated herein.

The one or more input shaft gears 103a, 103b, 103c, 103d can include a first input shaft gear 103a, a second input shaft gear 103b, and a third input shaft gear 103c, each configured to rotate relative to the input shaft 101 when disengaged by the one or more synchronizers 125, 127 and to rotate with the input shaft 101 when engaged by the one or more synchronizers 125, 127. The one or more clutch shaft input gears 109a, 109b, 109c, 109d can include a first clutch shaft input gear 109a on the first clutch shaft 105 meshed with the first input shaft gear 103a and configured to rotate relative to the first clutch shaft 105 when the first clutch 115 is disengaged and to rotate with the first clutch shaft 105 when the first clutch 115 is engaged (e.g., when the clutch piston compresses one or more friction discs against one or more separator discs).

The one or more clutch shaft input gears 109a, 109b, 109c, 109d can include a second clutch shaft input gear 109b on the second clutch shaft 107 meshed with the second input shaft gear 103b and configured to rotate relative to the second clutch shaft 107 when the second clutch 117 is disengaged and to rotate with the second clutch shaft 107 when the second clutch 117 is engaged. The one or more clutch shaft input gears 109a, 109b, 109c, 109d can include a third clutch shaft input gear 109c on the first clutch shaft 105 meshed with the third input shaft gear 103c and configured to rotate relative to the first clutch shaft 105 when the first clutch 115 is disengaged and to rotate with the first clutch shaft 105 when the first clutch 115 is engaged.

In certain embodiments, as shown each of the first clutch shaft input gear 109a, second clutch shaft input gear 109b, and third clutch shaft input gear 109c can be mounted to the respective clutch shaft 105, 107 via bearings, e.g., similar as described above with respect to the input shaft gears 103a, 103b, 103c. In certain embodiments, e.g., as shown, the one or more clutch shaft input gears 109a, 109b, 109c can be mounted on and/or formed from an outer clutch basket of the one or more clutches 105, 107, however, any other assembly is contemplated herein.

Figure 7:
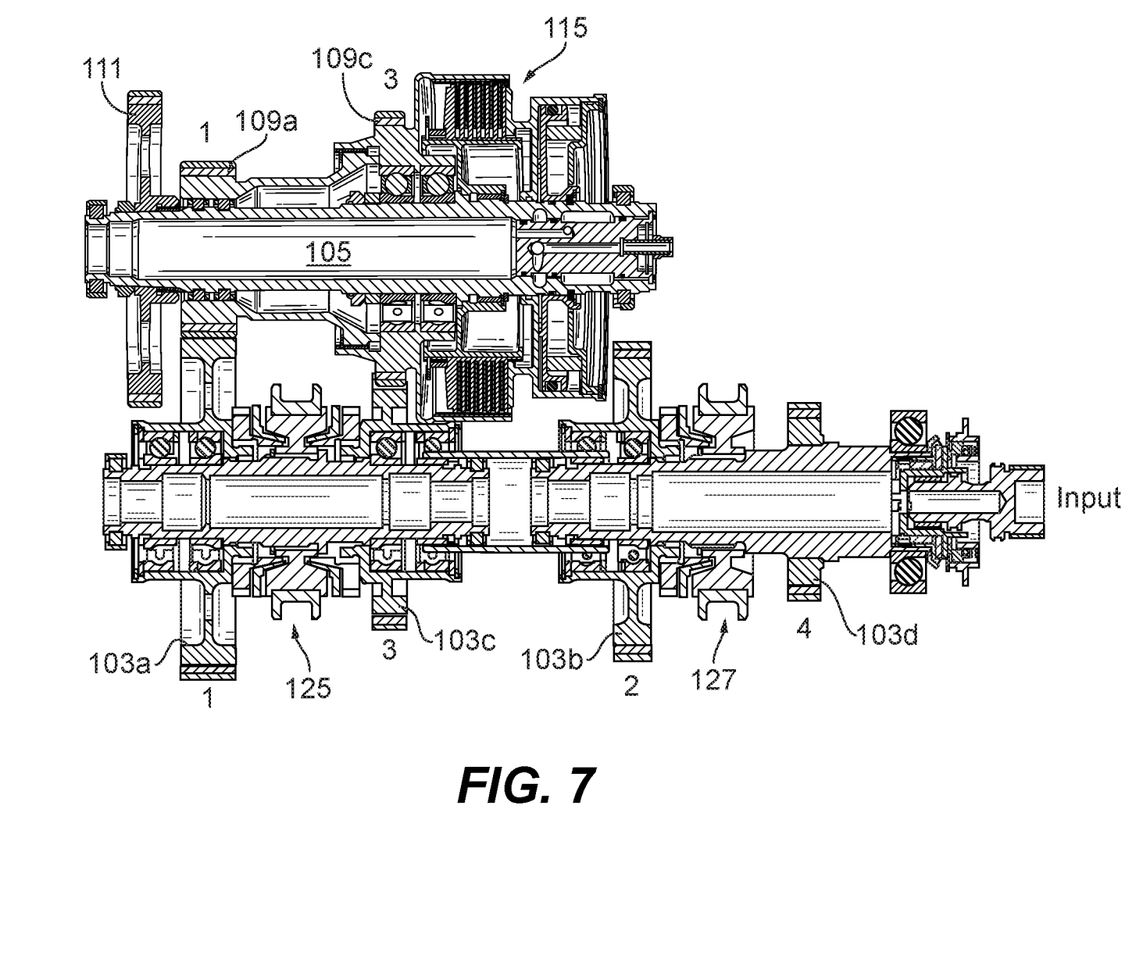
FIG. 7 is a cross-sectional view of the embodiment of FIG. 1, sectioned through the input shaft and the first clutch shaft.
Figure 8:
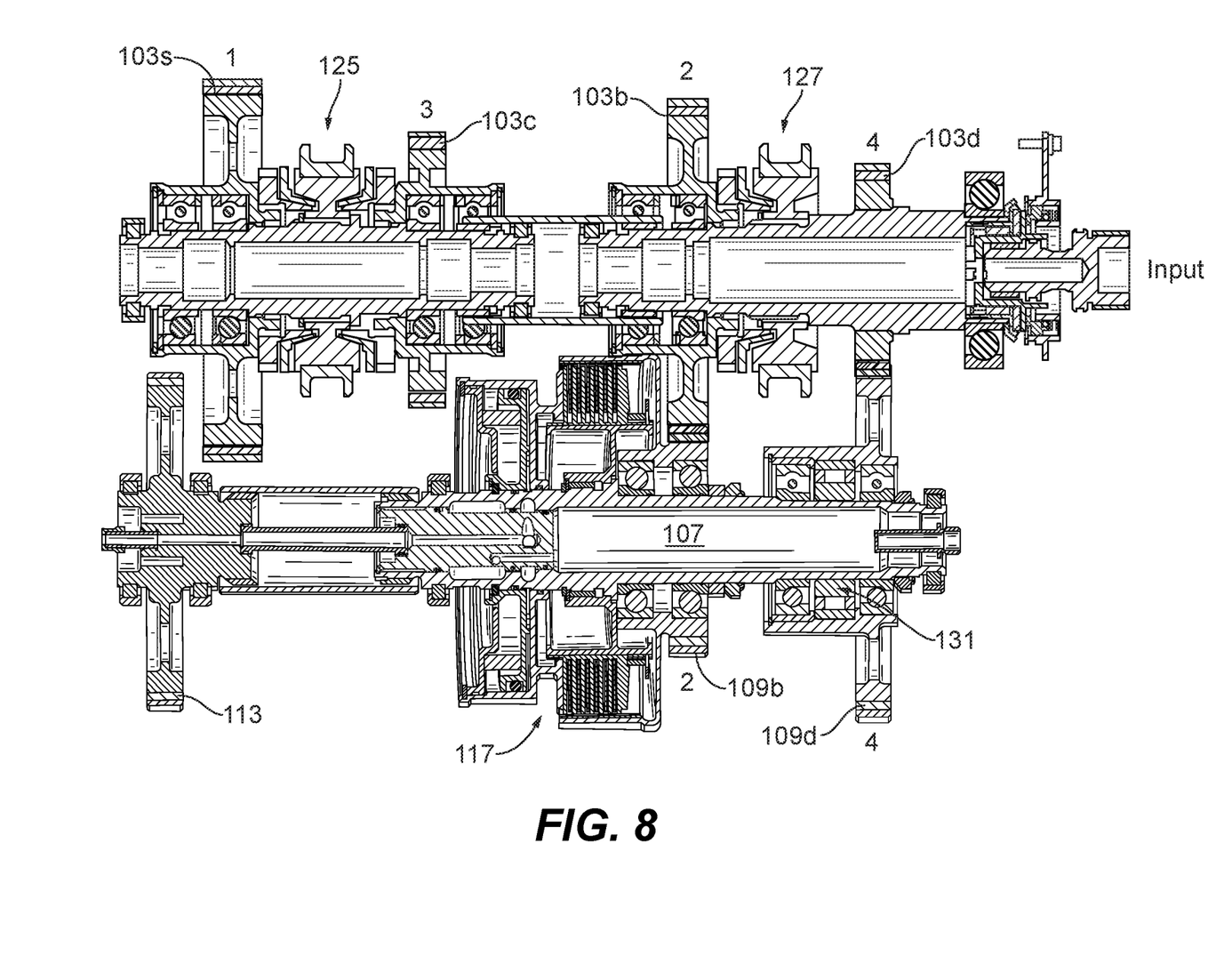
FIG. 8 is a cross-sectional view of the embodiment of FIG. 1, sectioned through the input shaft and the second clutch shaft.

Referring additionally to FIGS. 7 and 8, the one or more synchronizers 125, 127 can include a first synchronizer 125 and a second synchronizer 127. The first synchronizer 125 can be configured to engage the first input shaft gear 103a to the input shaft 101 when actuated in a first direction (e.g., to the left as shown in FIG. 7), and to engage the third input shaft gear 103c when actuated in a second direction (e.g., to the right as shown in FIG. 7). The second synchronizer 127 can be configured to engage the second input shaft gear 103b to the input shaft 101 when actuated. Any other suitable arrangement is contemplated herein.

The at least one clutch shaft output gear 111, 113 can include a first clutch shaft output gear 111 fixed to the first clutch shaft 105 to rotate with the first clutch shaft 105 and a second clutch shaft output gear 113 fixed to the second clutch shaft 107 to rotate with the second clutch shaft 107.

Figure 5:
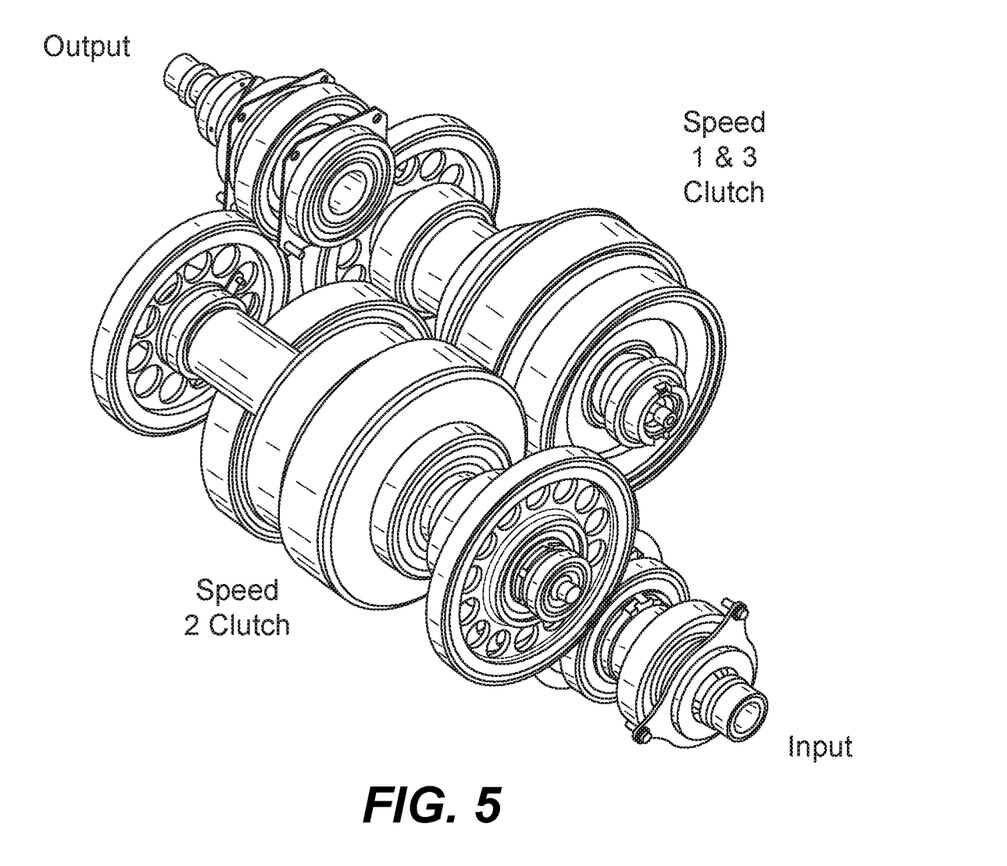
FIG. 5 is a perspective view of the embodiment of FIG. 1.
Figure 6:
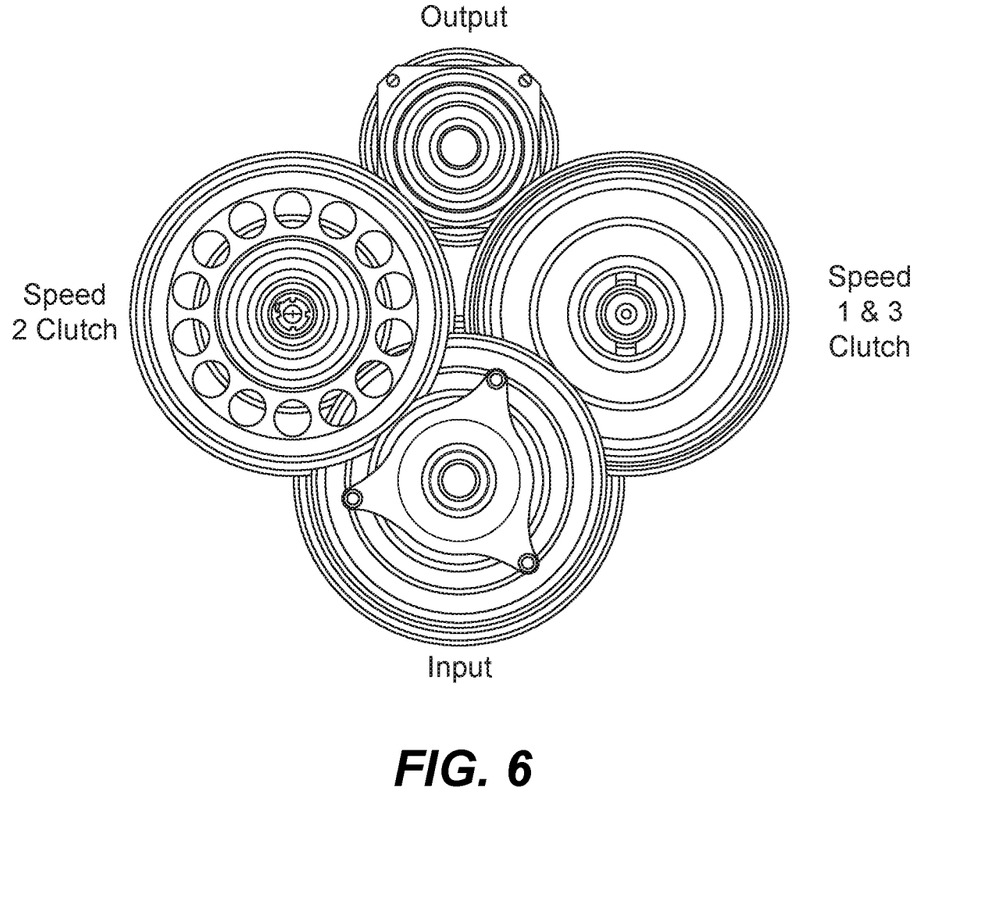
FIG. 6 is a plan view of the embodiment of FIG. 1.
Figure 9:
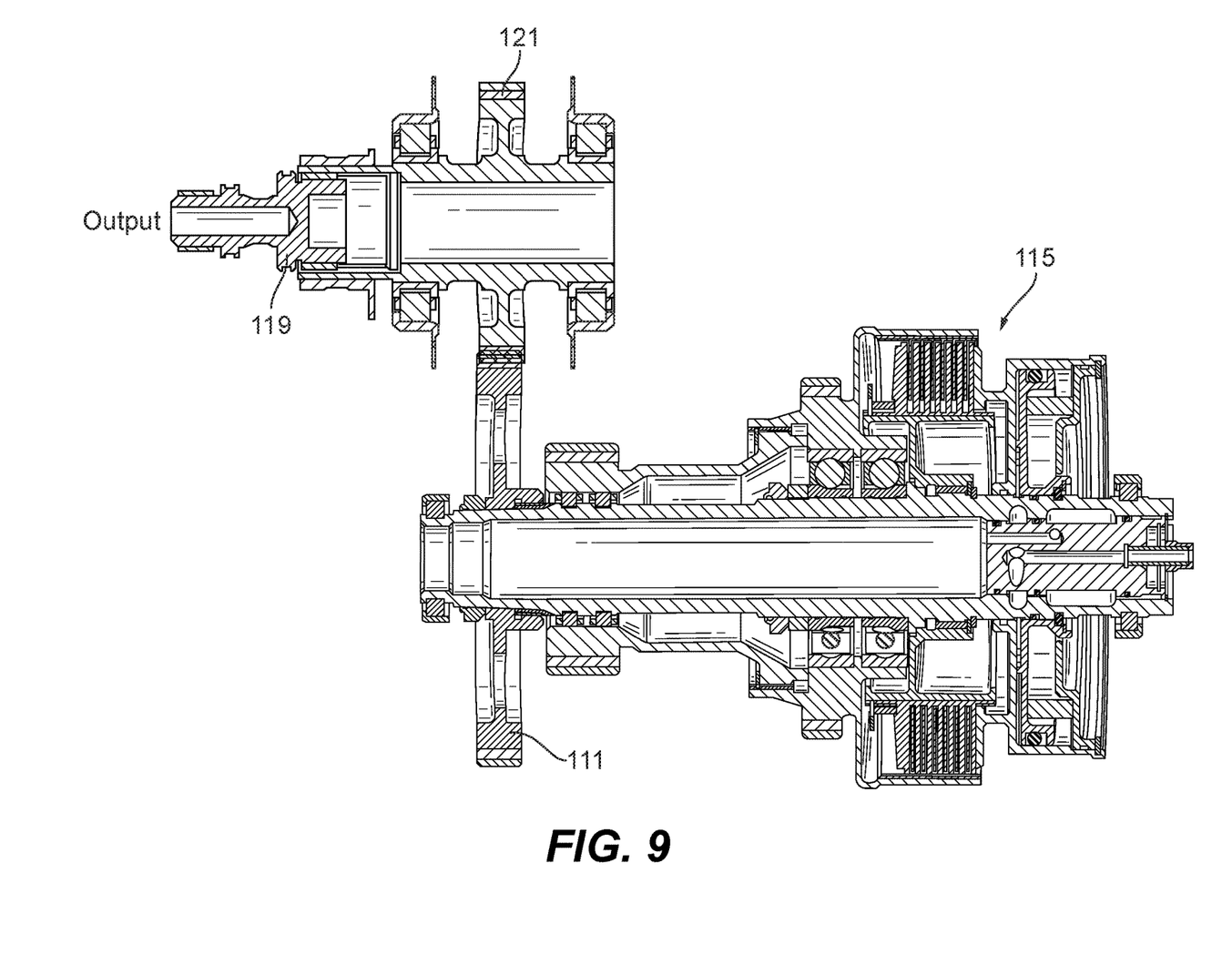
FIG. 9 is a cross-sectional view of the embodiment of FIG. 1, sectioned through the first clutch shaft and the output shaft.

Referring additionally to FIG. 9, the at least one output shaft gear 121 can include a single output shaft gear 121. The first clutch shaft output gear 111 and the second clutch shaft output gear 113 can both be meshed to the single output shaft gear 121, e.g., as shown in FIGS. 1 and 5. Any other suitable number of output shaft gears 121 is contemplated herein (e.g., one for each clutch shaft output gear).

The transmission 100 can include a fourth speed through at least one of the first clutch shaft 105 or the second clutch shaft 107 as shown, for example. For example, the one or more input shaft gears 103a, 103b, 103c, 103d include a fourth input shaft gear 103d fixed to the input shaft 101 to rotate with the input shaft 101. The one or more clutch shaft input gears 109a, 109b, 109c, 109d can include a fourth clutch shaft input gear 109d meshed with the fourth input shaft gear 103d and mounted to the first clutch shaft 105 or the second clutch shaft 107 (e.g., as shown) via an overrunning clutch 131.

Figure 10:
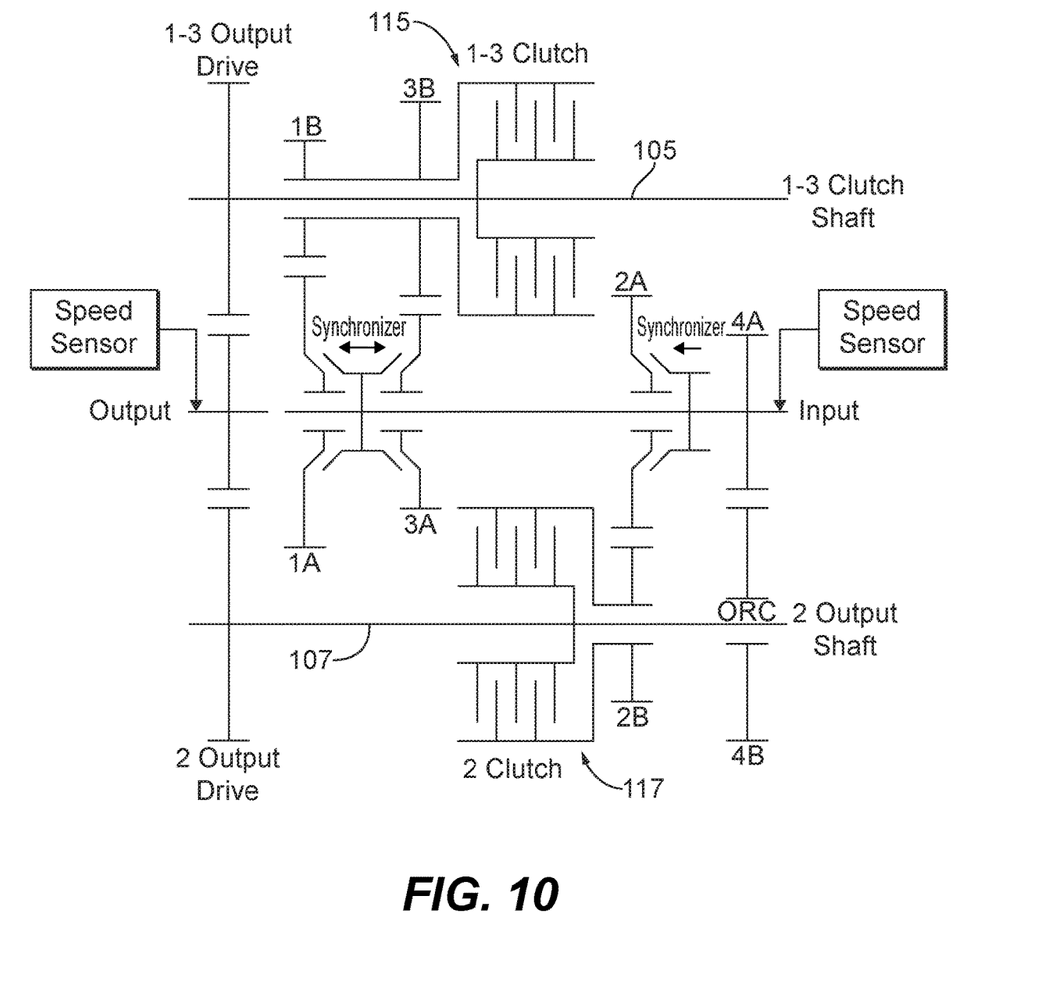
FIG. 10 is a schematic diagram of the embodiment of FIG. 1, shown including speed sensors.

As indicated by the numbers 1, 2, 3, and 4 in FIGS. 7, 8, and 10, in certain embodiments, the first speed can be achieved by moving the first synchronizer 125 in a first direction to engage the first input shaft gear 103a to the input shaft 101, which turns the first input shaft gear 103a with the input shaft 101 such that the first input shaft gear 103a drives the first clutch shaft input gear 109a, and by engaging the first clutch 115 to engage the first clutch shaft input gear 109a to the first clutch shaft 105 to turn the first clutch shaft 105 with the first clutch shaft input gear 109a, which turns the first clutch shaft output gear 111, which drives the output shaft gear 121 to turn the output shaft 119 in accordance with a first speed ratio relative to the input shaft 101. The second speed can be achieved by actuating the second synchronizer 127 to engage the second input shaft gear 103b to the input shaft 101, which turns the second input shaft gear 103b with the input shaft 101 such that the second input shaft gear 103b drives the second clutch shaft input gear 109b, and by engaging the second clutch 113 to engage the second clutch shaft input gear 109b to the second clutch shaft 107 to turn the second clutch shaft 107 with the second clutch shaft input gear 109b, which turns the second clutch shaft output gear 113, which drives the output shaft gear 121 to turn the output shaft 119 in accordance with a second speed ratio relative to the input shaft 101.

The third speed can be achieved by moving the first synchronizer 125 in a second direction (e.g., to the right as shown, opposite the first direction) to engage the third input shaft gear 103c to the input shaft 101, which turns the third input shaft gear 103c with the input shaft 101 such that the third input shaft gear 103c drives the third clutch shaft input gear 109c, and by engaging the first clutch 105 to engage the third clutch shaft input gear 109c to the first clutch shaft 105 to turn the first clutch shaft 105 with the third clutch shaft input gear 109c, which turns the first clutch shaft output gear 111, which drives the output shaft gear 121 to turn the output shaft 119 in accordance with a third speed ratio relative to the input shaft 101. In certain embodiments, the fourth speed can be achieved by disengaging all clutches 115, 117 such that fourth input shaft gear 103d drives the fourth clutch shaft input gear 109d and the overrunning clutch 131 engages the fourth clutch shaft input gear 109d to the second clutch shaft 107, which turns the second clutch shaft output gear 113, which drives the output shaft gear 121 to turn the output shaft 119 in accordance with a fourth speed ratio relative to the input shaft 101. Any other suitable synchronizer and/or clutch arrangements and/or actuation schemes are contemplated herein.

Figure 11:
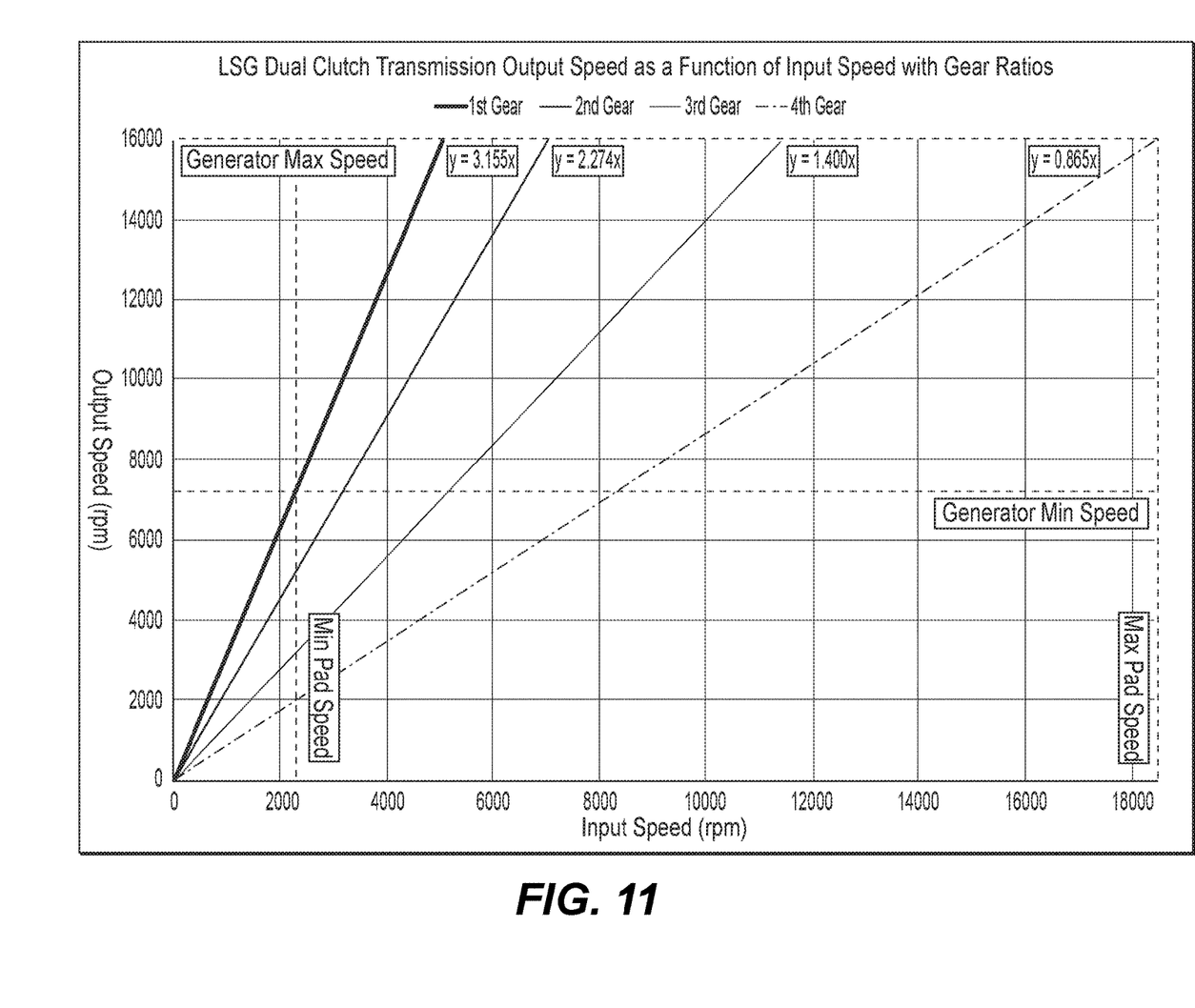
FIG. 11 is a chart showing an embodiment of speed ratio curves of each transmission speed as well as speed ranges for an embodiment of accessories attached to the transmission.
Figure 12:
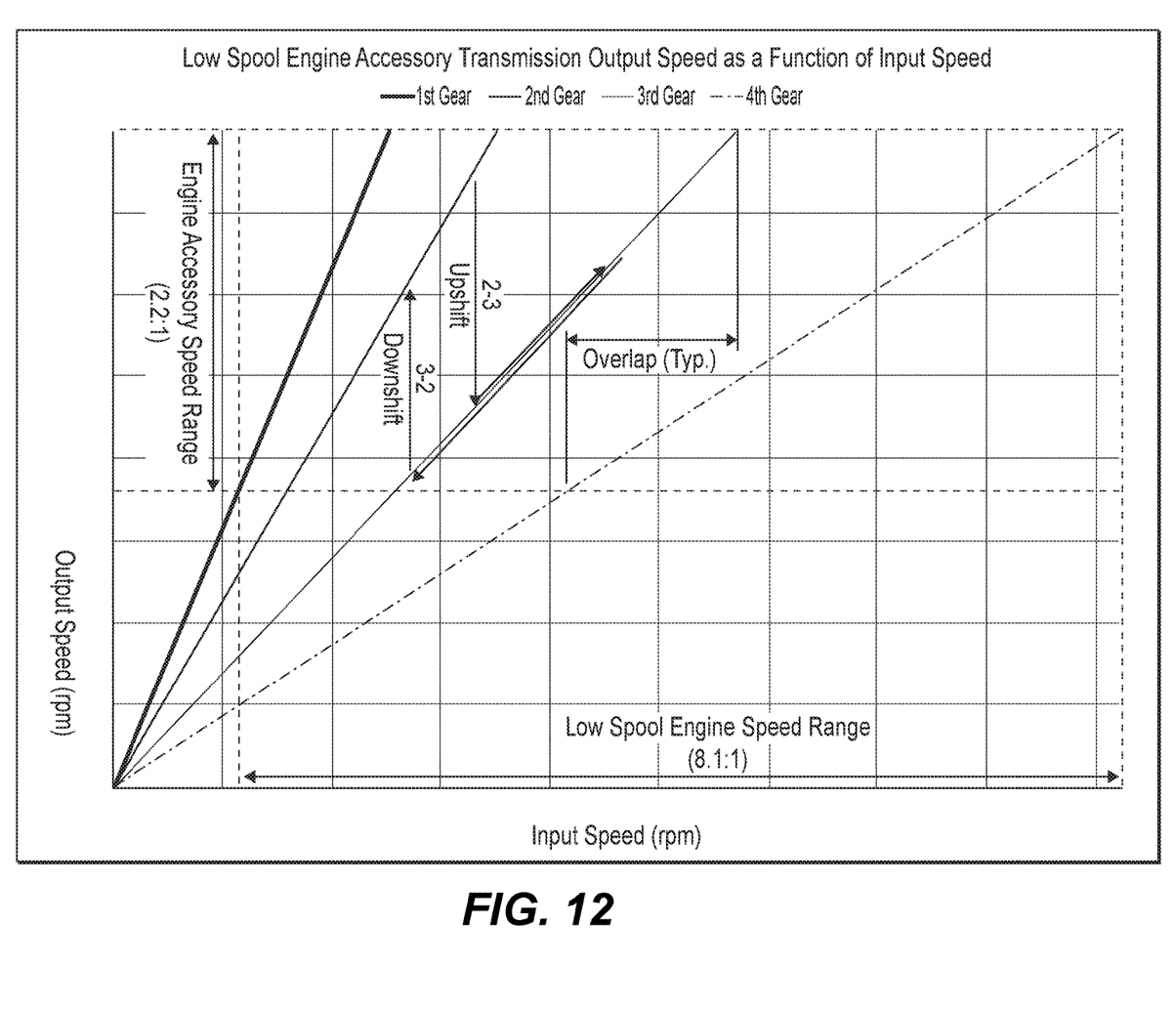
FIG. 12 is a chart showing an embodiment of a control scheme having hysteresis overlaid on the speed lines of FIG. 11.

Referring additionally to FIGS. 11 and 12, in certain embodiments, for a given input speed, the first gear output speed can be faster than the second gear output speed, the second gear output speed can be faster than the third gear output speed, and the third gear output speed can be faster than the fourth gear output speed. Any other suitable speeds and any suitable gear ratios are contemplated herein.

In accordance with at least one aspect of this disclosure, a method for controlling a transmission can include actuating a first synchronizer in a first direction on an input shaft to engage a first input shaft gear to the input shaft to drive a first clutch shaft gear on a first clutch shaft, and engaging a first clutch to engage the first clutch shaft gear to the first clutch shaft to achieve a first speed, actuating a second synchronizer on the input shaft to engage a second input shaft gear to the input shaft to drive a second clutch shaft gear on a second clutch shaft, disengaging the first clutch while engaging a second clutch to engage the second clutch shaft gear to the second clutch shaft to achieve a second speed, and actuating the first synchronizer in a second direction on the input shaft to engage a third input shaft gear to the input shaft to drive the third clutch shaft gear on the first clutch shaft, disengaging the second clutch while engaging the first clutch to engage the third clutch shaft gear to the first clutch shaft to achieve a third speed.

As shown in FIG. 10, the transmission 100 can include one or more speed sensors disposed on the input shaft 101 and/or the output shaft 119, for example. Any other suitable sensors are contemplated herein. Any suitable controller (not shown) having any suitable hardware and/or software configured to receive sensor signals (e.g., from the one or more speed sensors) and to control shifting between speeds (e.g., by operating clutches 105, 107 and synchronizers 125, 127, e.g., as disclosed above) is contemplated herein. Any suitable additional components or logic as appreciated by those having ordinary skill in the art in view of this disclosure is contemplated herein. Certain embodiments can utilize a single speed sensor on the input shaft, but a second one on the output shaft can verify the correct gear is engaged. Certain embodiments can control based on input speed, and an output sensor can be used for protection.

The method can include disengaging all synchronizers and clutches to cause an overrunning clutch to engage and to achieve a fourth speed. The method can include sensing speed at one or both of the input shaft and the output shaft using one or more speed sensors to determine when to actuate into a desired speed. The method can include providing hysteresis in shifting between speeds (e.g., having a lower upshift speed than a downshift speed between the same two gears), e.g., as shown. Any other suitable control method to achieve any suitable speed is contemplated herein.

In accordance with at least one aspect of this disclosure, an aircraft turbomachine low speed spool transmission can include four speeds. Any other suitable number of speeds (e.g., 3, 5, 10, etc.) is contemplated herein.

Embodiments as disclosed herein (e.g., described above) can be configured to operate with a turbomachine (e.g., an aircraft turbomachine). Embodiments include synchronizers on the input shaft, ahead of clutches, which is the opposite of a conventional transmission. Embodiments utilize one or more hydraulic clutches that have friction plates/discs attached to an inner wall of outer clutch bell, and other plates attached to an outer wall of inner clutch bell such that when a piston compresses against friction plates, the outer and inner bell are engaged.

Embodiments include a dual clutch shifting transmission for use in a low spool turbomachine engine accessory drive. Embodiments can take a large rotational input speed range and convert it into one or more (e.g., several) tighter speed ranges. Embodiments of a dual clutch approach can result in less drop off in torque carrying capability during the shifts.

Embodiments include a 4-speed dual clutch transmission for an aircraft low spool engine that can have dual clutches, 4 speeds, synchro-meshes, and an optional overrunning clutch. A desire by aircraft engine makers to extract power from the low spool engine for engine accessories (e.g., generators, pumps) instead of the high spool is hindered by the difference in speed ratios between the low spool and the accessories. Optimum accessory speed range ratios can be approximately 2:1 while the low spool speed range ratio could be as high as 10:1, for example. Taking power from the low spool allows the high spool to be made more efficient while also allowing for a lower idle speed which decreases brake wear.

Embodiments can convert a wide low spool engine speed range ratio (e.g., about 8.1:1) into a narrow speed range ratio (e.g., about 2.2:1) for driving engine accessories. Speed sensors on the input and output of the transmission can work with a transmission controller to initiate shifting via clutches and synchronizers. Overlaps between the gear ratios can be provided to prevent doorbelling at the shift points (i.e., to provide hysteresis).

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A multispeed turbomachine transmission, comprising:
an input shaft;
a plurality of input shaft gears disposed on the input shaft;
one or more clutch shafts;
one or more clutch shaft input gears disposed on the one or more clutch shafts, each meshed with at least one of the plurality of input shaft gears;
at least one clutch shaft output gear mounted to each clutch shaft;
a clutch connected to each clutch shaft and configured to selectively connect the one or more clutch shaft input gears to the at least one clutch shaft output gear;
an output shaft;
at least one output shaft gear connected to the output shaft and meshed with the at least one clutch shaft output gear, wherein one or more of the plurality of input shaft gears are rotatably mounted to the input shaft to be able to rotate relative to the input shaft; and
one or more synchronizers disposed on the input shaft and configured to selectively connect one or more of the plurality of input shaft gears to the input shaft such that the input shaft gears rotate with the input shaft,
wherein the one or more clutch shafts include a first clutch shaft having a first clutch disposed thereon, and a second clutch shaft having a second clutch disposed thereon
wherein the one or more input shaft gears include a first input shaft gear, a second input shaft gear, and a third input shaft gear each configured to rotate relative to the input shaft when disengaged by the one or more synchronizers and to rotate with the shaft when engaged by the one or more synchronizers
wherein the one or more clutch shaft input gears include a first clutch shaft input gear on the first clutch shaft meshed with the first input shaft gear and configured to rotate relative to the first clutch shaft when the first clutch is disengaged and to rotate with the first clutch shaft when the first clutch is engaged, wherein the one or more clutch shaft input gears include a second clutch shaft input gear on the second clutch shaft meshed with the second input shaft gear and configured to rotate relative to the second clutch shaft when the second clutch is disengaged and to rotate with the second clutch shaft when the second clutch is engaged, and wherein the one or more clutch shaft input gears include a third clutch shaft input gear on the first clutch shaft meshed with the third input shaft gear and configured to rotate relative to the first clutch shaft when the first clutch is disengaged and to rotate with the first clutch shaft when the first clutch is engaged,
wherein the one or more synchronizers include a first synchronizer and a second synchronizer, wherein the first synchronizer is configured to engage the first input shaft gear to the input shaft when actuated in a first direction, and to engage the third input shaft gear when actuated in a second direction, wherein the second synchronizer is configured to engage the second input shaft gear to the input shaft when actuated.

2. The transmission of claim 1, wherein the one or more synchronizers include at least one synchromesh.

3. The transmission of claim 1, wherein the transmission includes at least three speeds, wherein a first speed is through the first clutch shaft, a second speed is through the second clutch shaft, and a third speed is through the first clutch shaft.

4. The transmission of claim 1, wherein the at least one clutch shaft output gear includes a first clutch shaft output gear fixed to the first clutch shaft to rotate with the first clutch shaft and a second clutch shaft output gear fixed to the second clutch shaft to rotate with the second clutch shaft.

5. The transmission of claim 4, wherein the at least one output shaft gear includes a single output shaft gear, wherein the first clutch shaft output gear and the second clutch shaft output gear are both meshed to the single output shaft gear.

6. The transmission of claim 5, wherein the transmission includes a fourth speed through at least one of the first clutch shaft or the second clutch shaft.

7. The transmission of claim 6, wherein the one or more input shaft gears include a fourth input shaft gear fixed to the input shaft to rotate with the input shaft, and wherein the one or more clutch shaft input gears include a fourth clutch shaft input gear mounted to the first clutch shaft or the second clutch shaft via an overrunning clutch.

8. The transmission of claim 7, wherein the first speed is achieved by moving the first synchronizer in a first direction to engage the first input shaft gear to the input shaft, which turns the first input shaft gear with the input shaft such that the first input shaft gear drives the first clutch shaft input gear, and engaging the first clutch to engage the first clutch shaft input gear to the first clutch shaft to turn the first clutch shaft with the first clutch shaft input gear, which turns the first clutch shaft output gear, which drives the output shaft gear to turn the output shaft in accordance with a first speed ratio relative to the input shaft.

9. The transmission of claim 8, wherein the second speed is achieved by actuating the second synchronizer to engage the second input shaft gear to the input shaft, which turns the second input shaft gear with the input shaft such that the second input shaft gear drives the second clutch shaft input gear, and engaging the second clutch to engage the second clutch shaft input gear to the second clutch shaft to turn the second clutch shaft with the second clutch shaft input gear, which turns the second clutch shaft output gear, which drives the output shaft gear to turn the output shaft in accordance with a second speed ratio relative to the input shaft.

10. The transmission of claim 9, wherein the third speed is achieved by moving the first synchronizer in a second direction to engage the third input shaft gear to the input shaft, which turns the third input shaft gear with the input shaft such that the third input shaft gear drives the third clutch shaft input gear, and engaging the first clutch to engage the third clutch shaft input gear to the first clutch shaft to turn the first clutch shaft with the third clutch shaft input gear, which turns the first clutch shaft output gear, which drives the output shaft gear to turn the output shaft in accordance with a third speed ratio relative to the input shaft.

11. The transmission of claim 10, wherein the fourth speed is achieved by disengaging all synchronizers and all clutches such that fourth input shaft gear drives the fourth clutch shaft input gear and the overrunning clutch engages the fourth clutch shaft input gear to the second clutch shaft, which turns the second clutch shaft output gear, which drives the output shaft gear to turn the output shaft in accordance with a fourth speed ratio relative to the input shaft.

12. The transmission of claim 1, wherein for a given input speed, the first gear output speed is faster than the second gear output speed, wherein the second gear output speed is faster than the third gear output speed, wherein the third gear output speed is faster than the fourth gear output speed.

13. An aircraft turbomachine low speed spool transmission, comprising four speeds, wherein the low speed spool transmission includes, the multispeed turbomachine transmission of claim 1.

14. A method for controlling a transmission, comprising:
actuating a first synchronizer in a first direction on an input shaft to engage a first input shaft gear to the input shaft to drive a first clutch shaft gear on a first clutch shaft, and engaging a first clutch to engage the first clutch shaft gear to the first clutch shaft to achieve a first speed;
actuating a second synchronizer on the input shaft to engage a second input shaft gear to the input shaft to drive a second clutch shaft gear on a second clutch shaft, disengaging the first clutch while engaging a second clutch to engage the second clutch shaft gear to the second clutch shaft to achieve a second speed; and
actuating the first synchronizer in a second direction on the input shaft to engage a third input shaft gear to the input shaft to drive the third clutch shaft gear on the first clutch shaft, disengaging the second clutch while engaging the first clutch to engage the third clutch shaft gear to the first clutch shaft to achieve a third speed.

\* \* \* \* \*